United States Patent
Li et al.

(10) Patent No.: US 6,374,207 B1
(45) Date of Patent: Apr. 16, 2002

(54) METHODS, DATA STRUCTURES, AND COMPUTER PROGRAM PRODUCTS FOR REPRESENTING STATES OF INTERACTION IN AUTOMATIC HOST ACCESS AND TERMINAL EMULATION USING SCRIPTS

(75) Inventors: Yongcheng Li; John R. Hind; Yih-Shin Tan, all of Raleigh; Steven D. Ims, Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/247,261

(22) Filed: Feb. 10, 1999

(51) Int. Cl.[7] ........................... G06F 9/455; G06F 17/30
(52) U.S. Cl. ........................... 703/27; 703/22; 709/203; 709/227
(58) Field of Search .......................... 703/23, 24, 25, 703/27, 22; 379/67, 265; 345/348; 340/147; 709/203, 227

(56) References Cited

U.S. PATENT DOCUMENTS

| | | | | |
|---|---|---|---|---|
| 4,281,315 A | * | 7/1981 | Bauer et al. | 340/147 R |
| 5,410,679 A | * | 4/1995 | Lubold et al. | 395/500 |
| 5,524,137 A | * | 6/1996 | Rhee | 379/67 |
| 5,604,896 A | * | 2/1997 | Duxbury et al. | 395/500 |
| 5,611,048 A | * | 3/1997 | Jacobs et al. | 395/200.09 |
| 5,625,774 A | * | 4/1997 | Makimoto | 395/200.1 |
| 5,734,831 A | | 3/1998 | Sanders | 395/200.53 |
| 5,764,916 A | | 6/1998 | Busey et al. | 395/200.57 |
| 5,974,135 A | * | 10/1999 | Breneman et al. | 379/265 |
| 6,008,811 A | * | 12/1999 | McMillan | 345/348 |
| 6,011,915 A | * | 1/2000 | Aaker et al. | 395/500.44 |

OTHER PUBLICATIONS

Ball, "XML and the desperate Tcl hacker," Computer Networks and ISDN Systems, vol. 30, No. 1–7, pp. 713–715, Apr. 1998.

Floyd, "Create a push site in a day," WEB Techniques, vol. 3, No. 9, pp. 38, 40–42, Sep. 1998.

* cited by examiner

Primary Examiner—Russell W. Frejd
(74) Attorney, Agent, or Firm—Myers Bigel Sibley & Sajovec; Jeanine S. Ray-Yarletts

(57) ABSTRACT

Host interaction and terminal emulation sessions are conducted between a client and a resource by transitioning between terminal emulation states that represent interaction between the client and the resource. Transitions from a present terminal emulation state to a next terminal emulation state is automatically performed based on output provided by the resource and the present terminal emulation state. The terminal emulation may thereby be provided by ScriptUnits XML tags that represent the transitioning of terminal emulation states. The ScriptUnits can be parsed to create an object tree that can be manipulated using a visual editor. The visual editor may be used to change existing states in the terminal emulation session and add new states. The visual manipulation may allow a person who is unfamiliar with source programming languages to support the terminal emulation services. The format of the script representation may allow one vendor to import a script from another vendor to process in the importing vendor's internal structure without affecting the external terminal emulation programs.

26 Claims, 4 Drawing Sheets

METHODS, DATA STRUCTURES, AND COMPUTER PROGRAM PRODUCTS FOR REPRESENTING STATES OF INTERACTION IN AUTOMATIC HOST ACCESS AND TERMINAL EMULATION USING SCRIPTS

FIELD OF THE INVENTION

The present invention relates to the field of computer programming in general and more particularly to terminal emulation programs.

BACKGROUND OF THE INVENTION

A terminal emulation program may provide an interface between a client workstation and a resource needed by the client workstation. For example, a terminal emulation program embodied in a script running on a client workstation may provide responses to screens generated by the application running on a host computer. The terminal emulation script may provide input to the application as if it were the user. For example, the application may generate a logon screen to which the terminal emulation script may respond with a username/password that allows the client to access the application. In such a case, the terminal emulation script provides input to the application as if it were the user. Consequently, the terminal emulation script may automate some of the interaction between the user and the application.

As the complexity of the host interaction and terminal emulation increases it may be difficult to create an appropriate terminal emulation script. For example, as the use of the Internet increases conventional terminal emulation services may be offered over the World Wide Web (WWW) via a Graphical User Interface (GUI) rather than by traditional terminal emulation. The GUI terminal emulation may specify inputs from the user, how to interact with the application, and what data from the application is to be provided to the user, while host states change dynamically all of which may be difficult to accomplish using a script.

One alternative is to provide for more complex terminal emulation written in a scripting language such as JavaScript, Perl, Visual Basic, or TCL. Unfortunately, some people who support systems offering more complex host interaction and terminal emulation may be unfamiliar with these scripting languages. Moreover, a dedicated parser may be needed to play the emulation program. For example, a JavaScript parser may be needed to parse a terminal emulator script written in JavaScript.

In view of the above, there is a need to provide host interaction and terminal emulation between a client workstation and a resource, which handles dynamic host state changes automatically where the creator of the terminal emulation script may not be familiar with scripting and emulation programming languages used to provide conventional terminal emulation.

SUMMARY OF THE INVENTION

It is therefore, an object of the present invention to allow improvement in host interaction and terminal emulation services provided between a client and a resource.

It is another object of the present invention to allow terminal emulation scripts to be created and maintained by persons who are unfamiliar with conventional scripting and emulation programming language.

It is yet another object of the present invention to describe the scripts in a format consistent with emerging internet standard such that it is vendor implementation independent.

These and other objects of the present invention are achieved by representing terminal emulation states of interaction between a client and a resource using ScriptUnits. Furthermore, the ScriptUnits can be manipulated using a visual tool such as a graphical editor. The graphical editor may be used to change existing states in the terminal emulation session and add new states. The graphical manipulation may allow a person who is unfamiliar with source programming languages to support the host interaction and terminal emulation services.

In particular, terminal emulation service according to the present invention may be provided by transitioning from a first terminal emulation state of interaction between the client and the resource to a second terminal emulation state of interaction between the client and the resource selected from a plurality of possible next terminal emulation states based on output provided by the resource and the first terminal emulation state of interaction between the client and the resource.

In a further aspect of the present invention, the ScriptUnits are XML data structures that represent states of interaction in a terminal emulation session provided between the resource and the client. The XML data structure includes a ScriptID tag that represents a present terminal emulation state of interaction between the client and the resource. A StateDescription tag in the XML data structure represents output provided by the resource to the client defining the expected state. A NextState tag represents a next terminal emulation state of interaction between the client and the resource. Where the terminal emulation session can transition to one of a plurality of possible next terminal emulation states, the next terminal emulation state is selected based on the present terminal emulation state and the output provided by the resource following the execution of the action tag.

In one embodiment of the present invention, the client runs on a client workstation and the resource runs on a remote host computer. The terminal emulation program runs on a server logically located between the workstation and the host computer such as when the terminal emulation program runs on a mid-tier server to provide terminal emulation service to client Web browsers accessing resources over the World Wide Web (WWW).

DETAILED DESCRIPTION OF THE PREFERRED EMBODIMENTS OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

It will be understood that the term "application" as used herein includes resources from which the client requests service. As used herein the term "client" includes applications which request services from resources. The clients and the applications described herein (in whole or in part) may be remote from one another or resident in the same location. As used herein the term "ScriptUnit" refers to a collection of related XML tags and characters included between the characters <ScriptUnit> and <ScriptUnit>. As used herein the term "terminal emulation" includes any forms of user or programmable access and interactions with datastreams generated from the resources. A terminal emulation session is conducted by a terminal emulation program between the client and the application by transitioning from one terminal emulation state to another to provide the service requested by the client. Those having skill in the art will understand that a screen is a visualization of host datastreams in traditional terminal emulation. As used herein the term "screen" refers to the contents of datastreams exchanged between the client and resources.

Figure 1A:
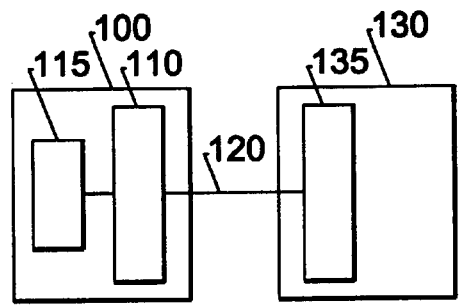
FIG. 1A is a block diagram of a first embodiment of the terminal emulation program according to the present invention.
Figure 1B:
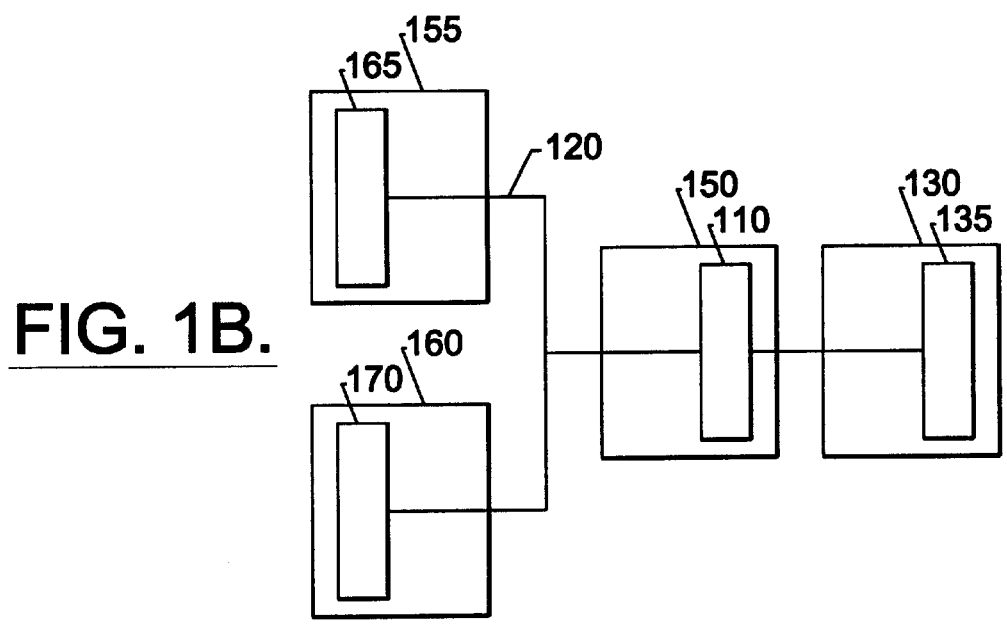
FIG. 1B is a block diagram of a second embodiment of terminal emulation program according to the present invention.

FIG. 1A is a block diagram of a first embodiment of a terminal emulation program 110 (script) that provides terminal emulation sessions for a client 115 running on a workstation 100 that interfaces with an application 135 running on a host computer 130 via a connection 120 between the client and the application such as a network. The terminal emulation program 110 receives output from the application 135 in the form of screens that are characterized by features such as types of data fields or cursor positions on the screen. The terminal emulation program 110 determines which screen the application 135 provides by examining the features on the screen to determine the present state. The terminal emulation program 110 responds to the screens by sending data, such as characters to the application 135. For example, when the application 135 provides a login screen to the terminal emulation program 110, the terminal emulation program 110 determines that the screen includes the feature USERID and inputs a username/password to the application 135 which logs the client 115 into the application 135. It will be understood that, as shown in FIG. 1B, the user and the client may be remote from each other such as when the terminal emulation program 110 runs on a mid-tier server 150 to conduct terminal emulation sessions for multiple clients 165, 170 (such as web browsers) running on respective client workstations 155, 160.

The terminal emulation session carried out by the terminal emulation program 110 progresses by transitioning between known terminal emulation states. The terminal emulation states represent discrete situations in the terminal emulation session arrived at via a series of screens provided by the application 135 and responses thereto provided by the terminal emulation program 110. For example, after providing the username/-password as described above, the terminal emulation session transitions to one of three next terminal emulation states depending on the screen provided by the application in response to the username/password from the client.

In particular, if the username/password is correct the application 135 provides a welcome screen that the terminal emulation program 110 recognizes using features known to be associated with the welcome screen. If the username/password is incorrect the application 135 provides a logon failed screen which the terminal emulation program 110 recognizes using features known to be associated with the logon failed screen. If the username/password is correct and the user is already logged on, the application 135 provides an already logged on screen that the terminal emulation program 110 recognizes using features known to be associated with the already logged on screen. Accordingly, the next terminal emulation state to which the terminal emulation session transitions depends on the screen provided by the application 135 in response to the username/password at the logon screen (the present terminal emulation state). Moreover, the screen provided by the application 135 may depend on conditions not known to the terminal emulation program 110 such as when the username/password is correct and the terminal emulation session transitions to the first state associated with a first time logon (welcome screen) or transitions to the second state if the user has already logged on (the already logged on screen).

Figure 2:
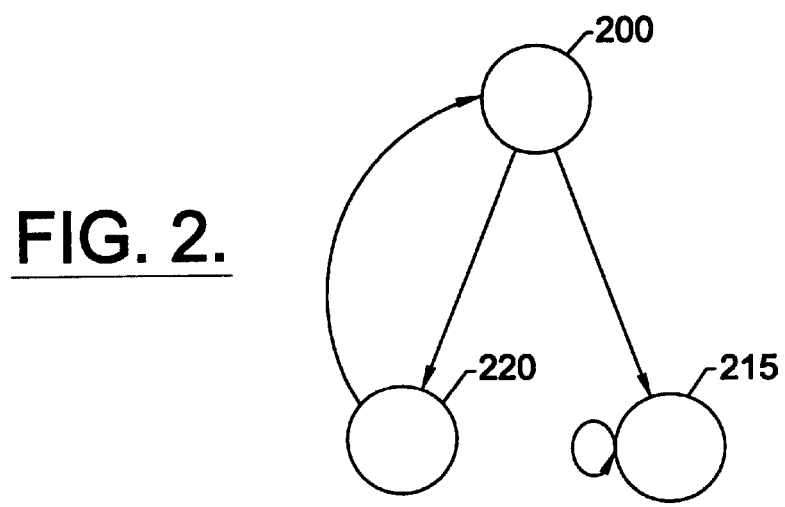
FIG. 2 is a state diagram that illustrates a first embodiment of a terminal emulation session according to the present invention.

FIG. 2 is a state diagram that illustrates a first embodiment of a terminal emulation session according to the present invention. According to FIG. 2, the terminal emulation session begins in a first terminal emulation state 200 wherein the application provides the login screen, for example, to the terminal emulation program 110. During the first terminal emulation state 200, the terminal emulation program 110 responds to the login screen by providing the username/password to the application 135. If the username/password are correct, the application 135 provides a welcome screen to the terminal emulation program 110. The terminal emulation program 110 recognizes the welcome screen and the terminal emulation session transitions to a second terminal emulation state 215. Thereafter the terminal emulation session remains in the second terminal emulation state 215 until the terminal emulation program 110 provides an input to the application 135 such as a command issued by the user.

If the username/password provided in the first terminal emulation state 200 are incorrect, the application 135 provides a logon failed screen to the terminal emulation program 110. The terminal emulation program 110 recognizes the logon failed screen and the terminal emulation session transitions to a third terminal emulation state 220 wherein the terminal emulation program 110 requests another logon attempt by issuing a command to the application 135. While in the third terminal emulation state 220, the application 135 responds to the request by providing a new logon screen to the terminal emulation program 110. When the new logon screen is recognized by the terminal emulation program 110, the terminal emulation session transitions back to the first terminal emulation state 200 where the logon may be retried.

The operations of the terminal emulation program 110 are implemented using data structures organized as ScriptUnits written in Extensible Markup Language (XML). In one embodiment, each ScriptUnit data structure represents a state of the terminal emulation session provided by the terminal emulation program. It will be understood that other languages known to those having skill in the art may be used to implement data structures for the terminal emulation program 110 described herein. A preferred embodiment of an XML ScriptUnit according to the present invention is:

```
<Script Unit>
   <ScriptID> name of ScriptUnit</ScriptID>
   <StateDescription>
      <Keyword> a term that appears on the screen
         </Keyword>
   </StateDescription>
   <Action>
      Input from terminal emulation program to Application
   </Action>
   <Extraction>
      Output from application to terminal application program
   </Extraction>
   <ActionLink>
      Invoke helper applications
   </ActionLink>
   <NextScreen>
      <ScriptID> First possible next state</ScriptID>
      <ScriptID> Second possible next state</ScriptID>
      <ScriptID> Third possible next state</ScriptID>
      . . .
   </NextState>
</Script Unit>
``` where the ScriptUnit includes XML tags and characters. The XML tags are organized using the characters < . . . > to identify the beginning of an XML tag and the characters </ . . . > to identify the end of the XML tag. The characters included between the XML tags are interpreted based on the XML tags used to delimit the characters. For example, the XML tags <ScriptUnit> and </ScriptUnit> are used to identify the characters (and other XML tags) included between the ScriptUnit tags as related to each other. In other words, the XML tags and characters included between <ScriptUnit> and </ScriptUnit> are played upon the instantiation of the ScriptUnit. The characters can embody commands to be issued to the application 135 or other instructions, data structures, and operations known to those having skill the art.

The name of the ScriptUnit is located between the <ScriptID> and </ScriptID> tags. Accordingly, the ScriptUnit can be instantiated using the characters included between the ScriptID tags. In a preferred embodiment, the characters included between the ScriptID tags represent the name of a state of interaction between the application 135 and the client 115. For example, the first terminal emulation state 200 may be represented with a ScriptUnit having the ScriptID equal to logon which represents the logon screen provided to the client 115 by the application. Accordingly, the XML tags and characters included between the ScriptUnit tags are associated with the logon state of interaction.

The XML tags included between the <StateDescription> and <StateDescription> tags describe features of the screen provided to the terminal emulation program by the application to define the state represented by the ScriptUnit. In particular, the state features include the characters delimited by the XML tags <Keyword> and </Keyword> and other tags for specific characteristics such as types of data fields or cursor positions. Accordingly, features included between the Keyword tags are associated with the state represented by the ScriptUnit having the ScriptID.

The actions included between the <Action> and the </Action> tags are input to the application when the terminal emulation program 110 determines that some features of the screen provided by the application 135 match the features included between the StateDescription tags (such as the Keyword or Cursor position, tags). Thus the actions are taken once the correct state is determined.

The extractions included between the <Extract> and </Extract> tags are output regions retrieved from the screen provided by the application when the terminal emulation program 110 determines that the correct state is encountered. There are subtags included to define the regions such as their names and boundaries.

The XML data structures between the <ActionLink> and the </ActionLink> tags are interactions with local helper applications taken when the terminal emulation program 110 determines that the correct state is encountered. Subtags, such as their names and parameters, are included to define the interactions.

The <Extract> and </Extract> tags and the <ActionLink> and </ActionLink> tags are processed prior to the execution of the actions included between the <Action> and </Action> tags such that they are based on the same state as the actions are taken.

The ScriptID(s) included between the <NextState> and the </NextState> tags are the ScriptIDs of states that represent the next state of the terminal emulation session. In particular, the terminal emulation program 110 determines its next state by examining the features of the screen provided in response to characters input by the Action tags. The features of the screen provided by the application 135 are compared to the features of the ScriptIDs listed between the NextState tags. The ScriptID that includes features that match the features of the screen provided by the application 135 is selected to be the next state of the terminal emulation session. The terminal emulation program 110 then plays the ScriptUnit having the matching ScriptID.

Figure 3:
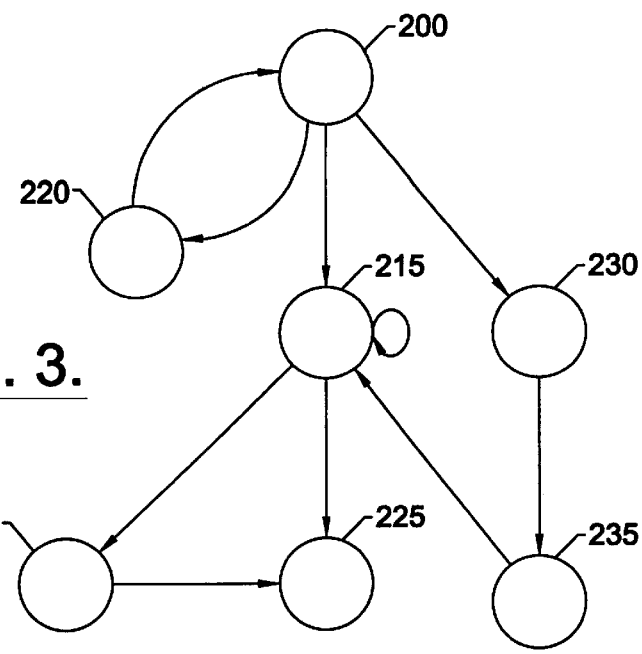
FIG. 3 is a state diagram that illustrates a second embodiment of a terminal emulation session according to the present invention.

FIG. 3 is a state diagram that illustrates a second embodiment of a terminal emulation session according to the present invention. A ScriptUnit that represents the logon screen as the first terminal emulation state 200 is:

```
<ScriptUnit>
   <ScriptID>logon </ScriptID>
   <StateDescription>
      <Keyword>USERID</Keyword>
   </StateDescription>
   <Action>
      <inputname>username</inputname>[tab]
         <inputname>passw ord</inputname>[enter]
   </Action>
   <NextState>
      <ScriptID>welcome </ScriptID>
      <ScriptID>logonfailed</ScriptID>
      <ScriptID>alreadyloggedon<ScriptID>
   </NextState>
</ScriptUnit>.
```

The ScriptID tags identify the logon ScriptUnit. The StateDescription tags include the keyword USERID so that the logon screen can be identified. Accordingly, if the screen provided by the application includes the keyword USERID, the terminal emulation program 110 determines that the terminal emulation session is in the terminal emulation state represented by the ScriptUnit having the ScriptID equal to logon and proceed with the action tags.

The actions included between the Action tags are input to the application 135 when the terminal emulation program 110 determines that the screen provided by the application 135 includes the keyword USERID. For example, after receiving the screen including USERID, the keystrokes username, tab, password, and enter are provided to the application 135. Subsequently, the application 135 may respond to the keystrokes by providing a new screen to the terminal emulation program 110.

The ScriptUnit names included between the NextState tags are the names of the ScriptUnits that represent the possible next state in the terminal emulation session. The terminal emulation program 110 selects the appropriate next state from the list of terminal emulation states between the NextState tags by examining the screen provided by the application 135 in response to the characters included between the Action tags. In particular, the features of the ScriptIDs listed between the NextState tags are compared to the features of the screen provided by the application 135. The ScriptID that includes a feature that matches a feature of the screen is selected as the next terminal emulation state and the terminal emulation session transitions to that state. For example, if the username/password are incorrect the application 135 provides the logon failed screen, wherein the terminal emulation program 110 determines that the features of the logon failed screen and the features listed in the ScriptID welcome do not match. However, the terminal emulation program 110 determines that the features of the logon failed screen match the features listed in the ScriptID logon failed and transitions to the state represented by the logon failed ScriptUnit A ScriptUnit that represents the logon failed screen as the second terminal emulation state 220 is:

```
<ScriptUnit>
    <ScriptID>logonfailed</ScriptID>
    <StateDescription>
        <keyword>Enter one of the following</keyword>
    </StateDescription>
    <Action>
        logoff[enter]
    </Action>
    <NextState>
        <ScriptID>logon</ScriptID>
    </NextState>
</ScriptUnit>.
```

When the user enters an incorrect username/password in the ScriptUnit logon (the terminal emulation state 200), the application provides the logon failed screen that includes the characters Enter one of the following. The terminal emulation program 110 compares the features specified for the ScriptIDs listed between the NextState tags in the ScriptUnit logon. According to the exemplary ScriptUnit logon, the terminal emulation program 110 determines that the Keyword for the ScriptUnit welcome and the characters Enter one of the following from the screen provided by the application do not match. Next, the terminal emulation program 110 determines that the Keyword for the ScriptUnit logon failed (Enter one of the following) and the characters Enter one of the following from the screen provided by the application 135 match. Accordingly, the terminal emulation program 110 transitions to the second terminal emulation state 220 represented by the ScriptUnit logon failed. In a preferred embodiment, the comparisons stop when the terminal emulation program finds a match between features of the screen provided by the application and a ScriptUnit included between the NextState tags.

A ScriptUnit that represents the welcome screen as the third terminal emulation state 215 is:

```
<ScriptUnit>
    <ScriptID>welcome</ScriptID>
    <StateDescription>
        <Keyword>MORE . . . </Keyword>
    </StateDescription>
    <Action>[clear]</Action>
    <NextState>
        <ScriptID>welcome</ScriptID>
        <ScriptID>ready</ScriptID>
        <ScriptID>reconnect</ScriptID>
    </NextState>
</ScriptUnit>.
```

When the username/password provided in the first terminal emulation state 200 is correct, the welcome screen is provided. Upon recognizing the welcome screen, the welcome ScriptUnit sends the [clear] characters and examines the resulting screen provided by the application. Depending on pre-exiting conditions known to the application 135, one of three screens may result. The features of the resulting screen are compared to the possible next screens. For example, if the resulting screen includes a feature of the ready screen, the terminal emulation session transitions to the corresponding terminal emulation state (terminal emulation state 225).

A ScriptUnit that represents the alreadyloggedon screen as the fourth terminal emulation state 230 is:

```
<ScriptUnit>
    <ScriptID>alreadyloggedon</ScriptID>
    <StateDescription>
        <Keyword>Already logged on</Keyword>
    </StateDescription>
    <Action>logon <inputname> userid </inputname> here
        [enter]
    </Action>
    <NextState>
        <ScriptID>alreadyloggedon2</ScriptID>
    </NextState>
</ScriptUnit>.
```

When the username/password is correct and user has already logged in at some time in the past, the application 135 provides a screen that indicates that there is an existing process for the user and requests the user's username again. The alreadyloggedon ScriptUnit provides the user's username and the terminal emulation session transitions to the terminal emulation state represented by the alreadyloggedon2 ScriptUnit (terminal emulation state 235).

A ScriptUnit that represents the alreadyloggedon2 screen as the fifth terminal emulation state 235 is:

```
<ScriptUnit>
    <ScriptID>alreadyloggedon2</ScriptID>
    <StateDescription>
        <Keyword>Enter your password</Keyword>
    </StateDescription>
    <Action><inputname>password </inputname>[enter]</
        Action>
```

```
    <NextState>
        <ScriptID>welcome</ScriptID>
        <ScriptID>logonfailed</ScriptID>
    </NextState>
</ScriptUnit>
```

In the fifth terminal emulation state 235, the application 135 requests the user's password again to complete the transition to the welcome screen (terminal emulation state 215), or to the logonfailed state 220 if the password input was incorrect.

A ScriptUnit that represents the reconnect screen as the sixth terminal emulation state 240 is:

```
<ScriptUnit>
    <ScriptID>reconnect</ScriptID>
    <StateDescription>
        <Keyword>RECONNECT</Keyword>
    </StateDescription>
    <Action>b[enter]</Action>
    <NextState>
        <ScriptID>ready</ScriptID>
    </NextState>
</ScriptUnit>
```

As described above, when the user has already logged on some time in the past, the terminal emulation session transitions from the first terminal emulation state 200 to the fourth terminal emulation state 230 to the fifth terminal emulation state 235 and to the third terminal emulation state 215, wherein the application 135 provides the welcome screen. The terminal emulation session then transitions to the sixth terminal emulation state 240 wherein the application 135 provides a screen that includes the characters "ready". The terminal emulation session transitions to the terminal emulation state represented by the ready ScriptUnit (terminal emulation state 235).

A ScriptUnit that represents the ready screen as the seventh terminal emulation state 225 is:

```
<ScriptUnit>
    <ScriptID>ready</ScriptID>
    <StateDescription>
        <Key word>Ready<Keyword>
    </StateDescription>
</ScriptUnit>
```

After the user logs on for the first time using the correct username/password or reconnects after logging in a second time (or more), the application 135 provides a ready screen to the client. The terminal emulation program 110 recognizes the ready characters and transitions to the seventh terminal emulation state 225, wherein the logon is complete.

A variation of the XML data structures allows a sequence of states to be included before the NextState tags. This may provide the advantage of skipping intermediate states or reducing the number of ScriptUnits needed to assemble a full script. For example, the alreadyloggedon state and the alreadyloggedon2 state can be combined into a single ScriptUnit as follows:

```
<ScriptUnit>
    <ScriptID>alreadyloggedon</ScriptID>
    <StateDescription>
        <Keyword>Already logged on</Keyword>
    </StateDescription>
    <Action>logon<inputname>userid<inputname>here[enter]</Action>
```
```
    <StateDescription>
        <Keyword>Enter your password</Keyword>
    </StateDescription>
    <Action><inputname>password</inputname>[enter]</Action>
    <NextState>
        <ScriptID>welcome</ScriptID>
        <ScriptID>logonfailed</ScriptID>
    </NextState>
</Script Unit>
```

Figure 4:
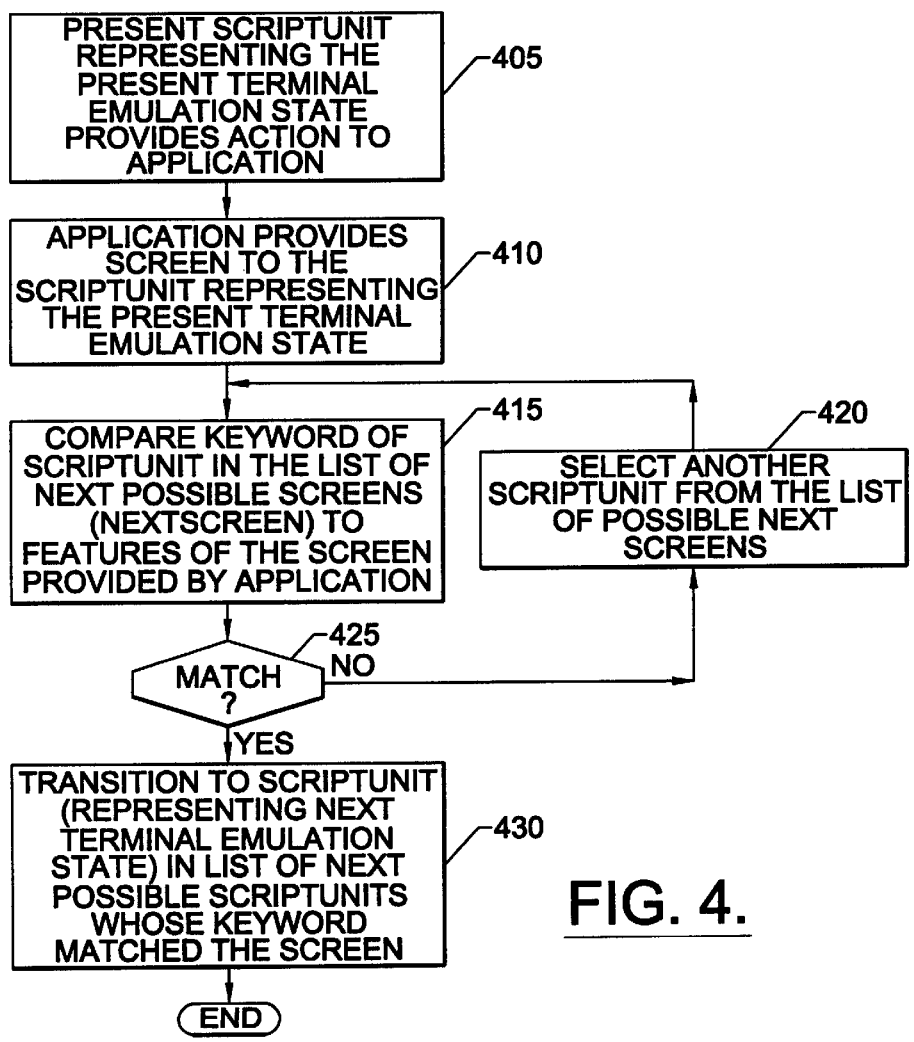
FIG. 4 is a flowchart that illustrates operations involving a determination of a next terminal emulation state according to the present invention.

FIG. 4 is a flowchart that illustrates operations involving a determination of a next terminal emulation state according to the present invention. The ScriptUnit that represents the present terminal emulation state provides the characters included between the Action tag to the application (block 405). In response, the application provides a screen to the ScriptUnit that represents the present terminal emulation state (block 410). The Keyword included in the first ScriptUnit in the list of possible next states is compared to the features of the screen provided by the application (block 415). If the Keyword included in the first ScriptUnit in the list of possible next states matches the features of the screen provided by the application (block 425), the terminal emulation program transitions to the ScriptUnit that matches the features of the state provided by the application (representing the next terminal emulation state) (block 430). If the features included in the first ScriptUnit in the list of possible next states does not match the features of the screen provided by the application (block 425), the features included in the next ScriptUnit in the list of possible next states is selected (block 420) and compared to the features of the screen provided by the application (block 415). This process continues until a match is found. If an unexpected state is encountered, a default action will be taken to terminate the script.

Figure 5:
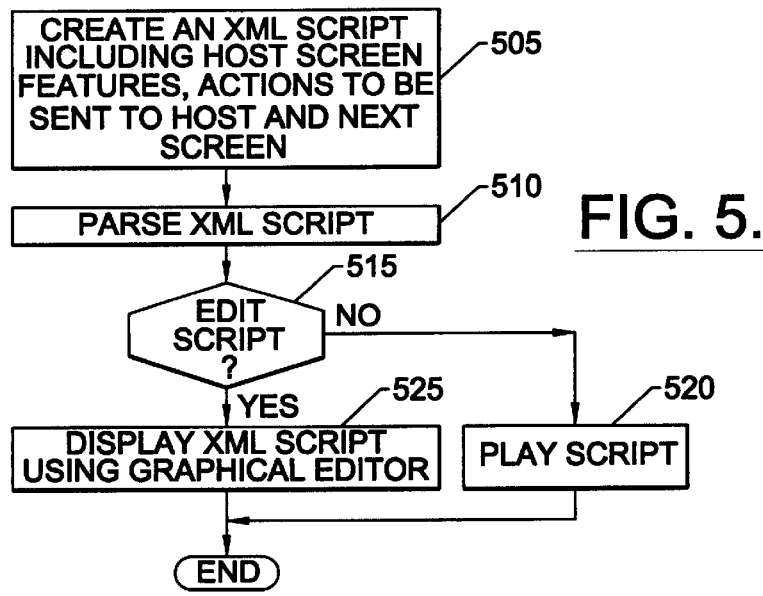
FIG. 5 is a flow chart that illustrates operations involving the manipulation of terminal emulation scripts using an editor according to the present invention.

FIG. 5 is a flowchart that illustrates operations involving the manipulation of terminal emulation scripts via an editor according to the present invention. The process begins in block 505 wherein an XML script is created using a text-based editor or by recording keystrokes (provided by a user) and features of screens provided by an application in response to the keystrokes. Features of the screens provided by the application are identified and recorded in the XML ScriptUnits and links are created between the screens to provide XML ScriptUnits according to the present invention. For example, when recording keystrokes, and the screens provided in response thereto, the user assigns a name to each of the screens provided and identifies features of the screens which are used to recognize the screen.

The XML script is parsed (block 510) to provide an object tree wherein the objects in the tree correspond to the ScriptUnits in the XML script and branches connecting the objects in the tree represent the state transitions between the ScriptUnits. For example, in the logon example, the object tree includes the welcome ScriptUnit and the logon ScriptUnit failed. The paths between the respective ScriptUnits represent the transitions between corresponding states such as those shown in FIG. 2.

If the user wishes to edit the XML script (block 515), the object tree is provided to a graphical editor which uses the branches in the object tree to provide a graphical representation of the terminal emulation states and the transitions between them (block 525). The existing ScriptUnits can be edited using the graphical editor, saved and the new XML script played to evaluate the changes. Moreover, the user may add states to the terminal emulation session. For example, the user may create additional XML ScriptUnits that represent new terminal emulation states and graphically add the new ScriptUnits to the object tree.

The user draws lines between the existing terminal emulation states and the new terminal emulation state to create the state transitions. The graphical editor updates the list of ScriptIDs included between the NextState tags to integrate the new ScriptUnits into the terminal emulation program 110. For example, when a line is drawn from the object that represents the logon screen to the object that represents the already logged on screen, the already logged on ScriptID is added to the list between the NextState tags in the logon ScriptUnit.

If the user wishes to play the XML script (block 520), the terminal emulation session progresses by transitioning from state to state depending on the characters provided by the terminal emulation program 110 and the responses thereto provided by the application 135 using the ScriptUnits described above.

Figure 6:
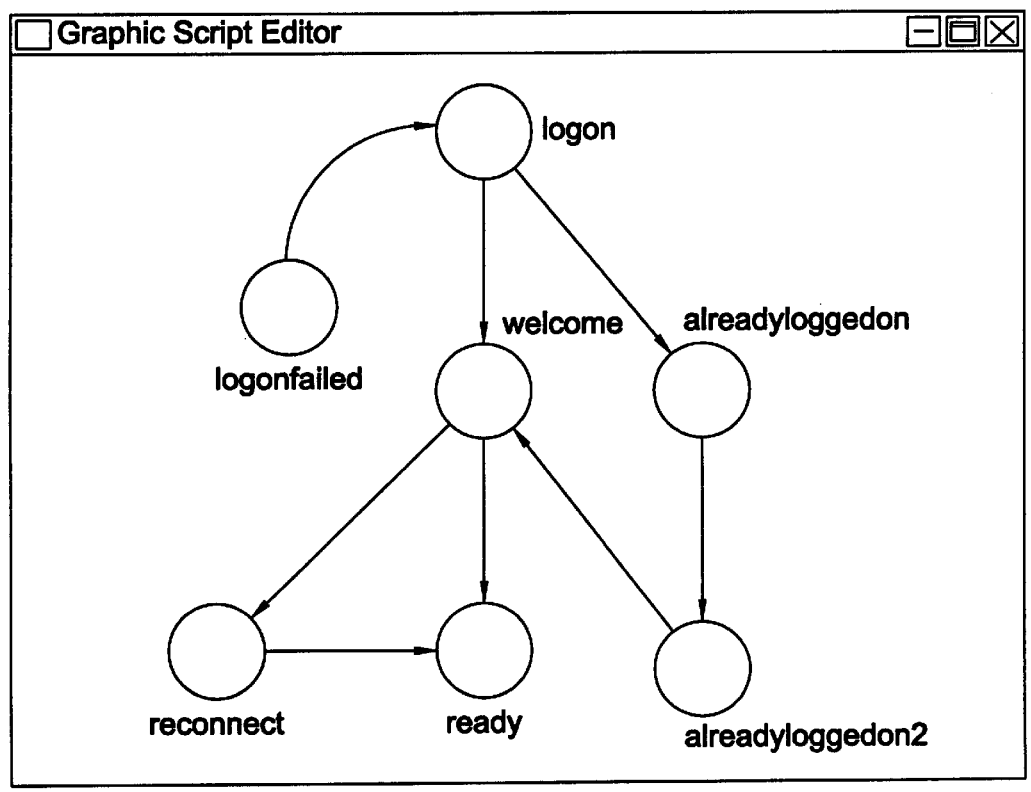
FIG. 6 is an embodiment of an object tree including XML script units and a graphical editor according to the present invention.

FIG. 6 is an embodiment of an object tree including XML ScriptUnits in a graphical editor according to the present invention. According to FIG. 6, the ScriptUnits described above have been parsed by the XML parser and assembled into the object tree described above that can be displayed by a graphical editor. The graphical editor shows the first through the seventh terminal emulation states. When the user clicks on a state, a dialog box appears including the text of the ScriptUnit that represents the respective state. For example, when the user clicks on the first terminal emulation state 200, a dialog box pops up containing the logon ScriptUnit described above. The user can edit the text of the logon ScriptUnit, save it, and re-run the XML script to evaluate the change. The user can also add new ScriptUnits to the XML script. For example, the user can create an already logged on ScriptUnit that represents a terminal emulation state where the user logs on after having already logged onto the system some time in the past. The already logged on ScriptUnit can be created as described above in reference to FIG. 5.

The ScriptUnits and XML script described herein may allow a more convenient approach to creating and editing complex scripts than provided by conventional techniques. The organization of the ScriptUnits may allow a visual tool to provide objects which can be manipulated by a user who may have little understanding of source code languages used to create conventional terminal emulation scripts. In conventional systems, source code languages such as C or Java may be needed to assemble the separate simple scripts into a complex script that performs terminal emulation.

Figure 7:
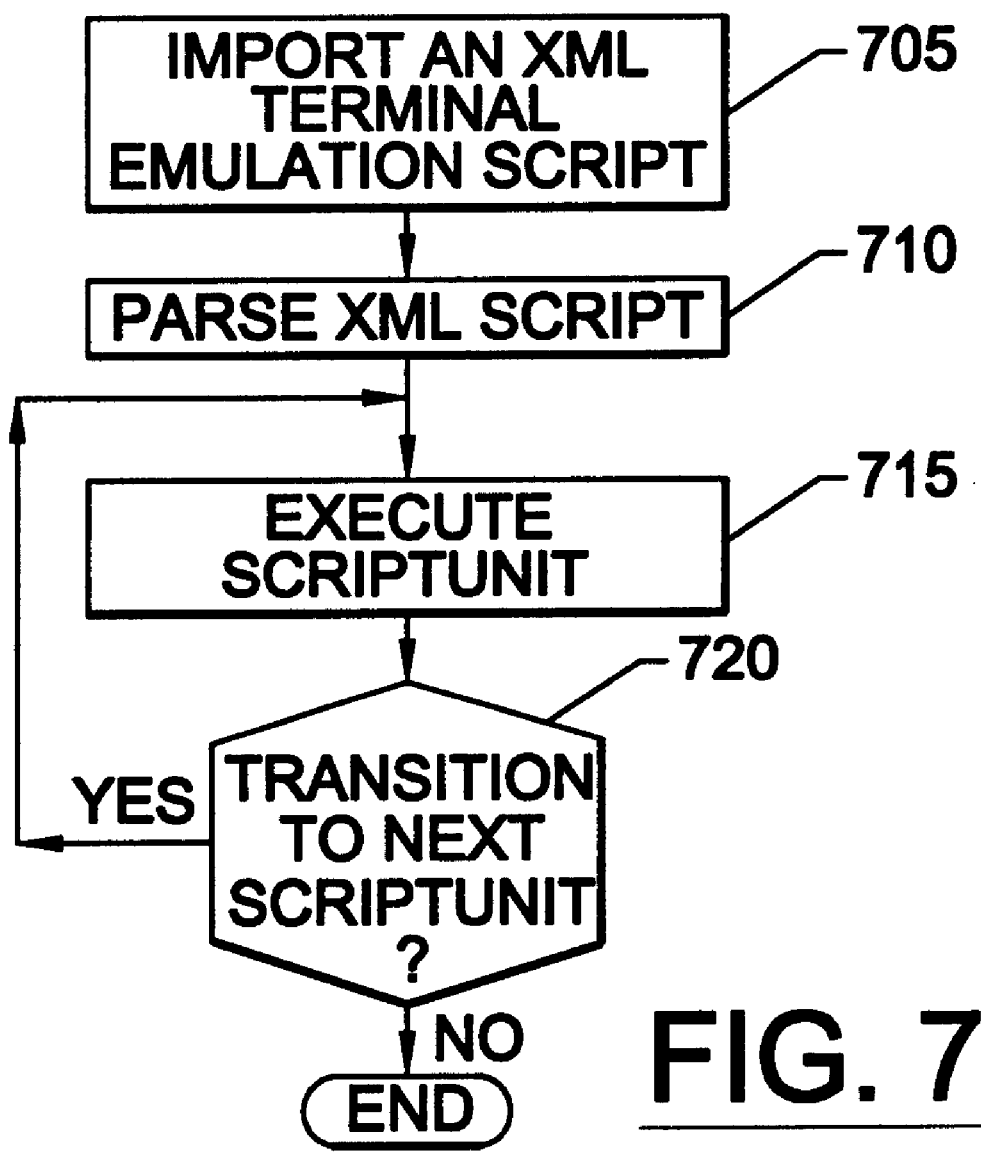
FIG. 7 is a flow chart that illustrates operations of terminal emulation scripts on the common data structure format provided by the present invention.

According to one aspect of the present invention, a common scripting format is provided for independent vendor implementations of terminal emulation script processing. FIG. 7 is a flowchart that illustrates operations involving the execution of terminal emulation scripts according to the present invention. The process begins in block 705 wherein an XML script is imported from a vendor implementation. The script is parsed.(block 710) into an object tree of ScriptUnits. Because the script format is language neutral and independent of the internal processing of terminal emulation, internal processing of the ScriptUnits is independent of the external. XML format. The main flow will be the same and simple for all implementations. After the script is parsed in block 710, the first ScriptUnit is started in the ScriptUnit execution block 715, which is illustrated in FIG. 4. The execution of block 715 results in a transition to the next selected ScriptUnit or the end of the script (block 720), at which time the execution of script is complete.

The present invention is described above using a flow chart illustrations and state diagrams. It will be understood that each block of the flowchart illustrations and state diagrams, and combinations of blocks in the flowchart illustrations or the state diagrams, can be implemented by computer program instructions. These program instructions may be provided to a processor(s) within a computer system, such that the instructions which execute on the processor(s) create means for implementing the functions specified in the flowchart block or blocks. The computer program instructions may be executed by the processor(s) to cause a series of operational steps to be performed by the processor(s) to produce a computer implemented process such that the instructions which execute on the processor(s) provide steps for implementing the functions specified in the flowchart block or blocks or in the state diagram state or states.

Accordingly, blocks of the flowchart illustrations or states of the state diagrams support combinations of means for performing the specified functions, combinations of steps for performing the specified functions and program instruction means for performing the specified functions. It will also be understood that each block of the flowchart illustrations or each state of the state diagrams, and combinations of blocks in the flowchart illustrations or combinations of states of the state diagrams, can be implemented by special purpose hardware-based systems which perform the specified functions or steps, or combinations of special purpose hardware and computer instructions.

As will be appreciated by one of skill in the art, the present invention may be embodied as methods, systems, or computer program products or combinations thereof. Accordingly, the present invention may take the form of an entirely hardware embodiment, an entirely software embodiment or an embodiment combining software and hardware aspects.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of providing terminal emulation service for a client that interacts with a resource comprising the step of transitioning from a first terminal emulation state of interaction between the client and the resource to a second terminal emulation state of interaction between the client and the resource selected from a plurality of possible next terminal emulation states based on output provided by the resource and the first terminal emulation state of interaction between the client and the resource using an XML data structure to represent the transitioning of respective terminal emulation states.

2. The method of claim 1, wherein the XML data structure comprises:

a first XML tag that represents the terminal emulation state of interaction between the client and the resource;

a second XML tag that represents the output to the client provided by the resource based on the first XML tag; and a third XML tag that represents one of the plurality of possible next terminal emulation states of interaction between the client and the resource based on the first and second XML tags.

3. The method of claim 2 wherein the XML data structure further comprises a fourth XML tag that represents input from the client to the resource, wherein the fourth XML tag is based on the first XML tag.

4. A method of representing terminal emulation service for a client that interacts with a resource comprising the step of creating an XML data structure that defines a first terminal emulation state of interaction between the client and the resource based on output provided by the resource and a second terminal emulation state of interaction between the client and the resource that represents a possible next terminal emulation state selected from a plurality of possible next terminal emulation states.

5. The method of claim 4, wherein the step of creating comprises the steps of:
   defining a first XML tag of the XML data structure that represents the output provided to the client from the resource;
   defining a second XML tag of the XML data structure that represents the possible next terminal emulation state selected from the plurality of possible next terminal emulation states of interaction between the client and the resource; and
   parsing the first and second XML tags to execute an XML script that provides the terminal emulation service for the client.

6. The method of claim 4, wherein the steps of defining comprise the step of editing the script with a text editor or a graphical editor.

7. The method of claim 4, wherein the step of creating comprises the steps of recording a script.

8. The method of claim 4, further comprising the step of playing the created XML script.

9. A system that provides terminal emulation service for a client that interacts with a resource, the system comprising:
   means for defining a first XML tag of the XML data structure that represents the output provided to the client from the resource;
   means for defining a second XML tag of the XML data structure that represents the possible next terminal emulation state selected from the plurality of possible next terminal emulation states of interaction between the client and the resource; and
   means for parsing the first and second XML tags to execute an XML script that provides the terminal emulation service for the client.

10. The system of claim 9, wherein the means for defining comprise means for editing the script with a text editor or a graphical editor.

11. The system of claim 9, wherein the means for creating comprises means for recording a script.

12. The system of claim 9, further comprising means for playing the created XML script.

13. A terminal emulation data structure that represents a state of interaction in a terminal emulation session provided between a resource and a client, the terminal emulation data structure comprising:
   a first tag that represents a present terminal emulation state of interaction between the client and the resource;
   a second tag that represents output provided by the resource to the client based on the first tag; and
   a third tag that represents a next terminal emulation state of interaction between the client and the resource.

14. The terminal emulation data structure of claim 13 further comprising a fourth tag that represents input from the client to the resource, wherein the fourth tag is based on the first tag.

15. The terminal emulation data structure of claim 13, wherein the tags are XML tags.

16. The terminal emulation data structure of claim 13, wherein the tags are created using a graphical editor.

17. The terminal emulation data structure of claim 13, wherein the third tag represents a next terminal emulation state of interaction between the client and the resource selected from a plurality of next possible terminal emulation states of interaction between the client and the resource based on the second tag.

18. A computer program product for providing terminal emulation service for a client that interacts with a resource comprising:
   a computer-readable storage medium having computer-readable program code means embodied in said medium, said computer-readable program code means comprising:
   computer readable program code means for transitioning from a first terminal emulation state of interaction between the client and the resource to a second terminal emulation state of interaction between the client and the resource selected from a plurality of possible next terminal emulation states based on output provided by the resource and the first terminal emulation state of interaction between the client and the resource, wherein the computer readable program code means for transitioning comprises:
   computer readable program code means for transitioning from a first terminal emulation state of interaction between the client and the resource to a second terminal emulation state of interaction between the client and the resource using an XML data structure to represent the respective terminal emulation states.

19. The computer program product of claim 18, wherein the XML data structure comprises:
   a first XML tag that represents the terminal emulation state of interaction between the client and the resource;
   a second XML tag that represents the output to the client provided by the resource based on the first XML tag; and
   a third XML tag that represents one of the plurality of possible next terminal emulation states of interaction between the client and the resource based on the first and second XML tags.

20. The computer program product of claim 19, wherein the XML data structure further comprises a fourth XML tag that represents input from the client to the resource, wherein the fourth XML tag is based on the first XML tag.

21. A computer program product for representing terminal emulation service for a client that interacts with a resource comprising:
   a computer-readable storage medium having computer-readable program code means embodied in said medium, said computer-readable program code means comprising:
   computer readable program code means for creating an XML data structure that defines a first terminal emulation state of interaction between the client and the resource based on output provided by the resource and a second terminal emulation state of interaction between the client and the resource that represents a possible next terminal emulation state selected from a plurality of possible next terminal emulation states.

22. The computer program product of claim 21, wherein the computer readable program code means for creating comprises:
   computer readable program code means for defining a first XML tag of the XML data structure that represents the output provided to the client from the resource;
   computer readable program code means for defining a second XML tag of the XML data structure that represents the possible next terminal emulation state selected from the plurality of possible next terminal emulation states of interaction between the client and the resource; and computer readable program code means for parsing the first and second XML tags to create an XML script that provides the terminal emulation service for the client.

23. The computer program product of claim 22, wherein the computer readable program code means for defining comprise:

computer readable program code means for editing the script with a text editor or a graphical editor.

24. The computer program product of claim 22, wherein the computer readable program code means for creating comprises:

computer readable program code means for recording a script.

25. The computer program product of claim 22 further comprising computer readable program code means for playing the created XML script.

26. A method of modifying a terminal emulation script, comprising:

parsing XML ScriptUnits associated with terminal emulation states;

providing a graphical object tree including graphical terminal emulation states associated with the ScriptUnits and paths therebetween;

receiving first input associated with at least one of the graphical terminal emulation states;

providing information associated with the ScriptUnit that is associated with the at least one of the graphical terminal emulation states; and to allowing second input to modify the ScriptUnit.

* * * * *